United States Patent [19]
Klemm

[11] 3,952,609
[45] Apr. 27, 1976

[54] FOOD WARMING CABINET HUMIDIFIER

[75] Inventor: Richard O. Klemm, Crystal Lake, Ill.

[73] Assignee: Food Warming Equipment Company, Elk Grove Village, Ill.

[22] Filed: Aug. 5, 1974

[21] Appl. No.: 494,454

[52] U.S. Cl. .................................................. 99/474
[51] Int. Cl.² ............................................. A47J 27/00
[58] Field of Search ............ 99/473, 474, 475, 476, 99/477, 478, 479, 482; 4/209, 209 FF, 109

[56] References Cited
UNITED STATES PATENTS

| 1,076,464 | 10/1913 | Stiriz | 99/473 X |
| 1,240,831 | 9/1917 | Doering | 4/109 X |
| 2,148,143 | 2/1939 | Waitzman | 99/477 |

FOREIGN PATENTS OR APPLICATIONS

| 739,146 | 10/1955 | United Kingdom | 99/259 |

*Primary Examiner*—Robert W. Jenkins
*Assistant Examiner*—Donald B. Massenberg
*Attorney, Agent, or Firm*—Kirkland & Ellis

[57] ABSTRACT

Disclosed is an apparatus for warming and humidifying food held within a food warming cabinet. Cool dry air within the food warming cabinet is drawn into an air intake chamber and exhausted through an opening in the air intake chamber by a fan. Air leaving the air intake chamber is forced through a tunnel. A humidifier pan having a reservoir full of water and a heating element are situated in the path of air flowing through the air tunnel. The air flowing through the tunnel is heated by the heating element and humidified by water evaporated from the humidifier pan. A porous material such as a sponge is placed in the water in the humidifier pan to increase the available surface area for evaporation. The porous material such as a sponge also acts as a wick to bring up the water from the humidifier pan to the porous materials' surface replacing the water evaporated by the forced-air passing over its surface. In addition, the porous material such as a sponge holds the water in the humidifier pan when moving the pan or the food warming cabinet, resulting in a more sanitary condition by preventing spillage and/or splashing inside the food warming cabinet. As cabinet air continues to circulate, the temperature and humidity within the cabinet continues to increase until an equilibrium is reached at the desired food temperature. Thereafter water essentially ceases to evaporate from the humidifier pan and humidification stops.

9 Claims, 4 Drawing Figures

U.S. Patent   April 27, 1976   3,952,609
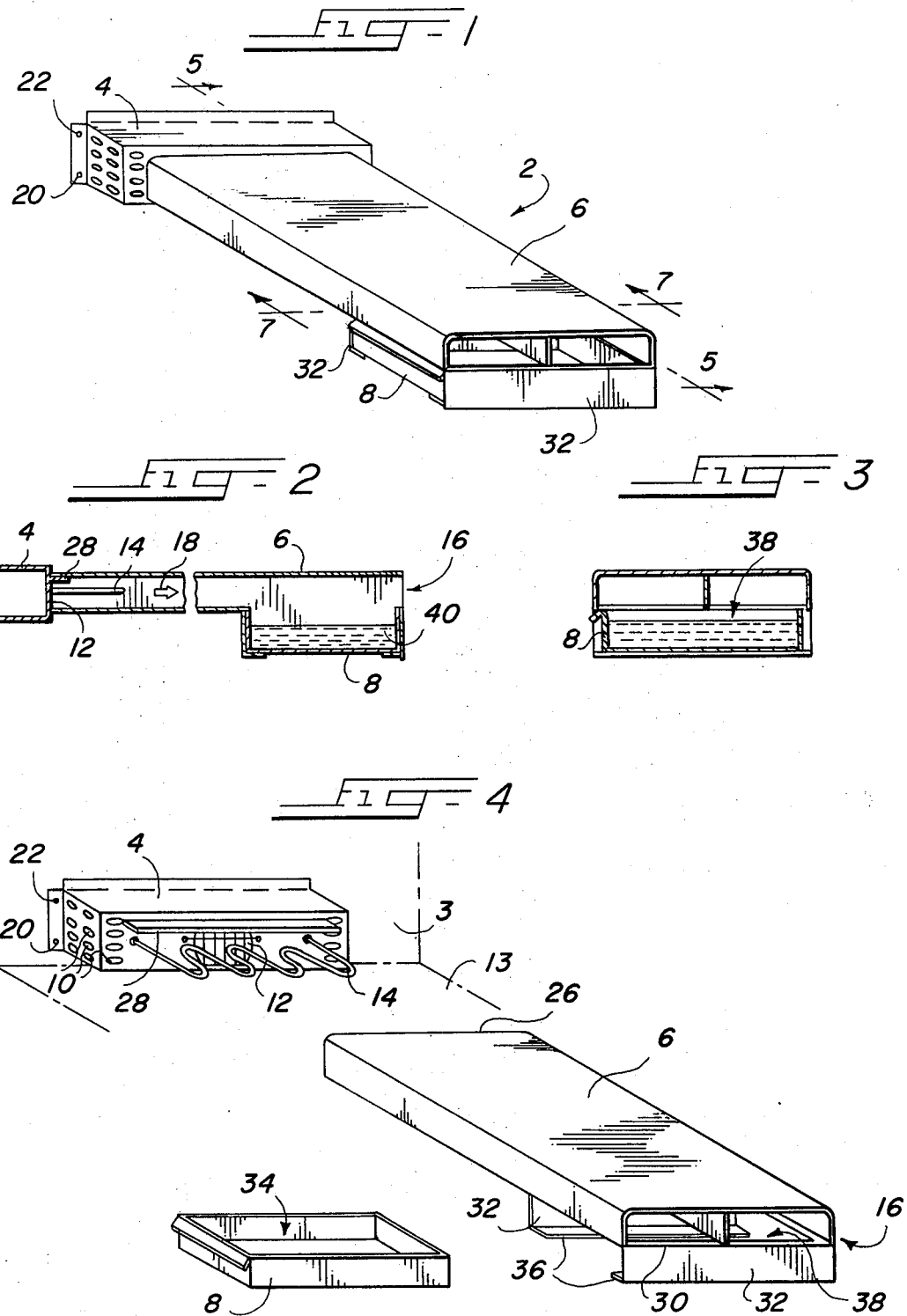

FOOD WARMING CABINET HUMIDIFIER

BACKGROUND OF THE INVENTION

1. Field of the Invention

The present invention relates to an apparatus for heating food. More particularly, the present invention relates to an apparatus having a heating element and a humidifier for heating and humidifying food held within a food warming cabinet.

2. Description of the Prior Art

There are presently many methods of warming food subsequent to cooking and of maintaining food in a warm state prior to serving. Food is sometimes warmed above "hot plates" or gas burners. Some restaurants use heat lamps or heating elements located above the food to keep it warm. These techniques are effective for food promptly served but result in food drying if the food is left exposed to such heat sources for an extended period of time. This type of food drying is the result of moisture escaping (evaporating from) the heated food and passing to the surrounding atmosphere.

To overcome the undesirable effect of food drying, food is sometimes warmed above a heated water reservoir from which steam is driven upward around the warming food. While this method eliminates much of the food drying, it creates an excess moisture problem in that steam rising tends to saturate many foods such as toast and bread products. As a result much of the food warmed by water steam techniques becomes overly moist and soggy.

To hold food for long periods of time food warming cabinets are frequently used. Food warming cabinets are generally maintained closed until the food held therein is served. The enclosure of the food is intended to minimize food drying by preventing moisture escaping (evaporating from) the warmed food from passing to the surrounding atmosphere. This method is not entirely satisfactory, however, because food within the cabinet continues to dry until the humidity level inside the cabinet reaches an equilibrium level at the cabinet temperature after which food drying essentially stops leaving food with considerably less than its natural moisture content.

A pan of water could be inserted inside a food warming cabinet and allowed to eventually evaporate. However, before the air could absorb the evaporated water to increase the airs' humidity sufficiently, the foods within the cabinet would have dried considerably.

The foregoing problems are readily solved by the present invention which humidifies while heating the food thereby eliminating or effectively minimizing the moisture loss from food.

BRIEF SUMMARY OF THE INVENTION

The present invention comprises an apparatus for simultaneously heating and humidifying the air within a food warming cabinet. The apparatus includes a cool air intake chamber equipped with a fan and an air tunnel enclosing a heating element and a humidifier.

Air is drawn into the cool air intake chamber from the food warming cabinet enclosure and forced out of the intake chamber through a tunnel by the action of the fan. The heating element and a humidifier are positioned along the path of air flow within the tunnel. Air flowing through the tunnel is heated as it passes over the hot heating element. The air thus heated then passes over the humidifier where moisture is added to the air by evaporation from a humidifier pan. To increase the rate of evaporation of water from the humidifier, a porous material such as a sponge is placed in the water in the humidifier pan so that the top surface of the porous material is saturated and extends above the water level. Hot air passing over the saturated porous material evaporates water from its surface thereby increasing the humidity of the heated air.

The air thus heated and humidified is circulated throughout the food warming cabinet maintaining the food held therein prior to serving at a predetermined temperature with substantially its natural moisture content.

As the air within the food warming cabinet is recirculated through the heating and humidifying apparatus a state of equilibrium is reached after which the evaporation from the humidifier pan decreases and essentially stops thereby preventing excessive moisture and consequent soggy food.

Thus an object of the present invention is to provide an apparatus for preventing food drying in a food warming cabinet.

Another object of the present invention is to provide an apparatus for humidifying a food warming cabinet without leaving the food held therein soggy.

Still another object of the invention is to provide a compact unit suited for installation within a food warming cabinet and capable of both heating and warming food held therein.

These and other objects of the present invention will be apparent to those skilled in the art from a reading of the detailed description of the invention and a study of the drawing relating thereto.

BRIEF DESCRIPTION OF THE DRAWINGS

FIG. 1 is a perspective view of food warming and humidifying apparatus in accordance with the present invention.

FIG. 2 is a cross section of the apparatus shown in FIG. 1 taken along line 5-5 with the hot air tunnel abbreviated.

FIG. 3 is a cross section of the apparatus shown in FIG. 1 taken along line 7—7.

FIG. 4 is a perspective view of the apparatus shown in FIG. 1 with its component parts separated.

DETAILED DESCRIPTION OF THE PREFERRED EMBODIMENT

With reference to FIG. 1, the heating and humidifying apparatus 2 of the present invention is located within a food warming cabinet (not shown) and comprises generally cool air intake chamber 4, hot air tunnel 6 and humidifier pan 8.

Referring to FIG. 4, cool air from within the food warming cabinet 3 (shown schematically) is drawn into cool air intake chamber 4 through cool air intake openings 10 and exhausted by a fan (not shown) through exhaust opening 12. Air passing through exhaust opening 12 is forced through hot air tunnel 6 and heated by heating element 14.

Referring to FIG. 2, exhaust opening 12 lies adjacent the open interior 16 of hot air tunnel 6 when the apparatus is assembled for operation (see FIG. 1 perspective view). Consequently all air entering cool air intake chamber 4 and exhausted through exhaust opening 12 is forced over heating element 14 and through open interior 16 of hot air tunnel 6 in the direction of arrow 18. After being heated, air flowing in hot air tunnel 6 passes above humidifier pan 8 and is humidified prior to its reentry into the food warming cabinet as will be explained in more detail below.

With reference to FIG. 4, cool air intake chamber 4 of heating and humidifying apparatus 2 (FIG. 1) is mounted by screws 20 attaching flange 22 to food warming cabinet 3 (shown schematically) near the floor 13 thereof. Hot air tunnel 6 is supported at its first end 26 by tunnel support lip 28 located directly above exhaust opening 12 on cool air intake chamber 4. Hot air tunnel 6 is supported at its second end 30 by humidifier pan support walls 32 which act as feet resting on the floor 13 of the food warming cabinet. The reservoir 34 of humidifier pan 8 is filled with water and fitted between humidifier pan support walls 32 above humidifier support wall extensions 36. Humidifier support wall extension support and urge humidifier pan 8 against the bottom of second end 30 of hot air tunnel 6. Opening 38 defined by that section of the bottom of hot air tunnel 6 lying between humidifier pan support walls 32, corresponds to the open top of reservoir 34 of humidifier pan 8.

With reference to FIGS. 2 and 3, hot air forced through the open interior 16 of hot air tunnel 6 evaporates the water from reservoir 34 of humidifier pan 8. Water evaporating from humidifier pan 8 rises through opening 38 of hot air tunnel 6 and is carried into the food warming cabinet by the flow of hot air.

In the preferred embodiment porous material 40 is inserted in humidifier pan 8 (see FIGS. 2 and 3) so that the top surface thereof extends slightly above the level of water in humidifier pan 8. The rough texture of the top surface of porous material 40 increased the available surarea for evaporation of reservoir 34 and the wicking action of the porous material thereby increases the evaporation rate of water in humidifier pan 8 in accordance with generally known physical principles. The rough texture of the top surface of porous material 40 is dried by hot air passing through hot air tunnel 6 thereby increasing the humidity content of air passing to the food warming cabinet.

The porous material 40 within humidifier pan 8 acts as a wick to bring water to its surface from humidifer pan 8 to replace water evaporated therefrom by the hot forced air passing over its surface. In addition, porous material 40 prevents water spillage from humidifier pan 8 when adding water and while the food warming cabinet is in motion resulting in a more sanitary condition inside the food warming cabinet.

Heating element 14 (see FIG. 4) may be equiped with a thermostatic switch to control the on-off operation thereof as the food warming cabinet interior reaches or departs from its predetermined desired temperature.

Initially the hot air passing through hot air tunnel 6 is very dry and consequently the evaporation rate of water from humidifier pan 8 is high. As the food warming cabinet humidity increases, however, the evaporation rate from humidifier pan 8 decreases until an equilibrium at the selected interior temperature is reached after which evaporation essentially stops thereby preventing excessive moisture accumulation and consequent soggy food. Thus the present invention brings the food warming cabinet to its humidity equilibrium state for the selected temperature by directly humidifying the food warming cabinet without steam thereby avoiding both drying and excessively moisturizing food contained therein.

There are, of course, many possible alternative embodiments of the present invention. Various additions, changes, modifications, and variations can be made in the apparatus illustrated or the elements thereof without departing from the spirit and scope of the invention.

I claim:

1. In a food warming cabinet having stationary open rack shelves for supporting food trays whereby hot air is allowed to circulate around food held therein and further having at least one access door, apparatus for warming and humidifying the food held within said food warming cabinet said apparatus comprising:
    a cool air intake chamber defining at least one cool air intake opening and at least one exhaust opening, said cool air intake chamber housed within said food warming cabinet;
    a heating element adjacent said at least one exhaust opening of said cool air intake chamber for heating air passing through said at least one exhaust opening;
    a hot air tunnel having first and second ends, said first end connected to said cool air intake chamber to enclose said at least one exhaust opening and said heating element, said hot air tunnel for directing the flow of hot air passing through said at least one exhaust opening;
    a circulation fan housed within said cool air intake chamber for drawing cool air into said cool air intake chamber through said at least one cool air intake opening and forcing air out of said cool air intake chamber through said at least one exhaust opening, over said heating element and through said hot air tunnel;
    a humidifier pan located directly below said second end of said hot air tunnel, said humidifer pan having a liquid reservoir with a top opening, said top opening of said liquid reservoir lying in the path of air being forced through hot-air tunnel.

2. Apparatus for warming and humidifying food held within a food warming cabinet as claimed in claim 1 wherein said cool air intake chamber comprises a rectangular box having first and second ends, first and second sides, and a top and a bottom, said top, bottom, and second side being solid to prevent air from passing therethrough, said ends and said first side defining a series of openings through which cool air is drawn prior to heating, said first side further defining an exhaust opening through which air is forced prior to heating.

3. Apparatus for warming and humidifying food held within a food warming cabinet as claimed in claim 2 wherein said first side of said cool air intake chamber further defines a hot air tunnel support lip for receiving and supporting said hot air tunnel, said hot air tunnel support lip located directly above said exhaust opening so that all air passing through said exhaust opening enters said first end of said hot air tunnel.

4. Apparatus for warming and humidifying food held within a food warming cabinet as claimed in claim 1 wherein said humidifier pan is held against the bottom of said second end of said hot air tunnel in a humidifier pan shelf so that the opening of said liquid reservoir corresponds to a similar opening in the bottom of said second end of said hot air tunnel thereby enabling evaporative water vapor rising from said liquid reservoir to enter the path of air being forced through said hot air tunnel.

5. Apparatus for warming and humidifying food held within a food warming cabinet as claimed in claim 4 wherein said liquid reservoir contains a liquid absorbing porous material such as a sponge, said liquid absorbing porous material extending slightly above the surface of the liquid contained within said liquid reservoir thereby increasing the effective surface area for evaporation of the liquid.

6. Apparatus for warming and humidifying food held within a food warming cabinet as claimed in claim 5 wherein said porous material such as a sponge extends to the side walls of said humidifier pan thereby preventing water spillage during movement of said humidifier pan.

7. Apparatus for warming and humidifying food held within a food warming cabinet as claimed in claim 5 wherein said porous material such as a sponge extends to the bottom of the humidifier pan thereby drawing up water from the bottom of the humidifier pan to replace water evaporated from the top surface thereof.

8. Apparatus for warming and humidifying food held within a food warming cabinet as claimed in claim 4 wherein said humidifier pan shelf comprises first and second walls each having extending therefrom a horizontal lip, said first and second walls for preventing lateral movement of said humidifier pan while supporting said second end of said hot air tunnel, said lips for urging said humidifier pan against the bottom of said second end of said hot air tunnel.

9. In a food warming cabinet having stationary open rack shelves for supporting food trays whereby hot air is allowed to circulate around food held therein and further having at least one access door, apparatus for warming and humidifying the food held within said food warming cabinet said apparatus comprising:

a cool air intake chamber defining at least one cool air intake opening and at least one exhaust opening, said cool air intake chamber comprising a rectangular box having first and second ends, first and second sides, and a top and a bottom, said top, bottom and second side being solid to prevent air from passing therethrough, said at least one cool air intake opening located in said ends and said first side defining at least one opening through which cool air is drawn prior to heating, said at least one exhaust opening located in said first side further defining said at least one exhaust opening through which air is forced prior to heading, said first side of said cool air intake chamber also defining a hot air tunnel support lip for receiving and supporting said hot air tunnel, said hot air tunnel support lip located directly above said exhaust opening so that all air passing through said exhaust opening enters said first end of said hot air tunnel;

a heating element adjacent said at least one exhaust opening of said cool air intake chamber for heating air passing through said at least one exhaust opening;

a hot air tunnel having first and second ends, said first end connected to said cool air intake chamber to enclose said at least one exhaust opening and said heating element, said hot air tunnel for directing the flow of hot air passing through said at least one exhaust opening;

a circulation fan housed within said cool air intake chamber for drawing cool air into said cool air intake chamber through said at least one cool air intake opening and forcing air out of said cool air intake chamber through said at least one exhaust opening and through said hot air tunnel;

a humidifier pan located near said second end of said hot air tunnel, said humidifier pan having a liquid reservoir with an opening, said opening of said liquid reservoir lying in the path of air being forced through said hot-air tunnel, said humidifier pan being held against the bottom of said second end of said hot air tunnel in a humidifier pan shelf so that the opening of said liquid reservoir corresponds to a similar opening in the bottom of said second end of said hot air tunnel thereby enabling evaporative water vapor rising from said liquid reservoir to enter the path of air being forced through said hot air tunnel, said liquid reservoir containing, a liquid absorbing porous material such as a sponge, said liquid absorbing porous material extending to the side walls of said liquid reservoir and slightly above the surface of the liquid contained within said liquid reservoir thereby increasing the effective surface area for evaporation of the liquid and preventing spillage of said liquid during movement of said humidifier pan.

* * * * *